United States Patent
Morley et al.

(10) Patent No.: US 9,688,808 B2
(45) Date of Patent: Jun. 27, 2017

(54) CURABLE EPOXY RESIN SYSTEMS CONTAINING MIXTURES OF AMINE HARDENERS AND AN EXCESS OF EPOXIDE GROUPS

(75) Inventors: Timothy A. Morley, Horgen (CH); Radhakrishnan Karunakaran, Lake Jackson, TX (US); Carol L. O'Connell, Lake Jackson, TX (US); Nigel Shields, Terneuzen (NL); Nikhil K. Verghese, Lake Jackson, TX (US); Martin Reimers, Buehl-Rittersbach (DE)

(73) Assignee: Dow Global Technologies LLC, Midland, MI (US)

( * ) Notice: Subject to any disclaimer, the term of this patent is extended or adjusted under 35 U.S.C. 154(b) by 512 days.

(21) Appl. No.: 13/529,929

(22) Filed: Jun. 21, 2012

(65) Prior Publication Data
US 2013/0005853 A1 Jan. 3, 2013

Related U.S. Application Data

(60) Provisional application No. 61/503,183, filed on Jun. 30, 2011.

(51) Int. Cl.
*C08L 63/00* (2006.01)
*C08G 59/50* (2006.01)
*C08G 59/68* (2006.01)

(52) U.S. Cl.
CPC ........... *C08G 59/50* (2013.01); *C08G 59/502* (2013.01); *C08G 59/5006* (2013.01); *C08G 59/5026* (2013.01); *C08G 59/686* (2013.01); *C08L 63/00* (2013.01)

(58) Field of Classification Search
CPC .............. C08G 59/502; C08G 59/5026; C08G 59/50–59/58; C08G 59/868; C08L 63/00–63/10; C09D 163/00–163/10; C09J 163/00–163/10

USPC .......................................................... 528/122
See application file for complete search history.

(56) References Cited

U.S. PATENT DOCUMENTS

| 3,956,237 A | * | 5/1976 | Doorakian et al. ............. 528/93 |
| 5,145,919 A | * | 9/1992 | Cavitt et al. ................... 525/481 |
| 5,414,067 A | | 5/1995 | Vratsanos |
| 5,958,593 A | * | 9/1999 | Shomer ......................... 428/413 |
| 2008/0197526 A1 | | 8/2008 | Shafi |
| 2008/0308972 A1 | | 12/2008 | Fanget |
| 2010/0144965 A1 | | 6/2010 | Marks |
| 2012/0022629 A1 | * | 1/2012 | Perera et al. ................. 623/1.11 |

FOREIGN PATENT DOCUMENTS

| JP | 2005220306 A | * | 8/2005 |
| WO | 2008-100730 A | | 8/2008 |
| WO | 2008-140906 A | | 11/2008 |
| WO | 2008-153542 A | | 12/2008 |

OTHER PUBLICATIONS

Dow Chemical, Dow Liquid Epoxy Resins, brochure (1999).*
Machine translation of JP 2005-220306 A.*
Poustkova et al., Eur. Food Res. Technol. (2004) 219:534-539.
Dionex, Rapid Separation of Bisphenol—A Diglycidyl Ether . . . Aug. 2009.

* cited by examiner

*Primary Examiner* — Kregg Brooks
(74) *Attorney, Agent, or Firm* — Gary C Cohn PLLC

(57) ABSTRACT

Fiber reinforced epoxy resin composites are produced using a specific epoxy resin system. The epoxy resin system contains at least one polyglycidyl ether of a polyphenol. The system also contains a hardener that contains a mixture of aminocyclohexanealkylamine and polyalkylene polyamine hardeners. The ratio of epoxy resin groups to amine hydrogen groups is from 1.05 to 1.50. The epoxy resin system contains a tertiary amine catalyst such as a tertiaryaminophenol, a benzyl tertiary amine or an imidazole compound.

3 Claims, No Drawings

CURABLE EPOXY RESIN SYSTEMS CONTAINING MIXTURES OF AMINE HARDENERS AND AN EXCESS OF EPOXIDE GROUPS

This application claims priority from U.S. Provisional Application No. 61/503,183, filed 30 Jun. 2011.

This invention relates to curable epoxy resin systems and processes for preparing thermosets from epoxy resin systems.

Curable epoxy resin systems are used in a number of processes to form thermosets. These systems are being increasingly investigated for producing large fiber-reinforced composites such as, for example, vehicular frame members and body panels, among many others. These composites can be made in a variety of molding or pultrusion processes in which reinforcing fibers are wetted with a mixture of an epoxy resin and a hardener, which is then cured in the presence of the fibers. Common molding processes or producing these composites include the various resin transfer molding (RTM) processes, including variants such as vacuum-assisted resin transfer molding (VARTM) and the Seeman Composites Resin Infusion Molding Process (SCRIMP).

It is important in these processes that the mixture of epoxy resin and hardener maintains a low viscosity for a period of time after they are mixed. As an epoxy resin/hardener mixture cures, its viscosity increases. If the viscosity becomes too high, the mixture does not flow readily around and between the fibers. This can lead to voids and other imperfections in the product. Other problems with premature viscosity development include the formation of visible flow lines in the product and incomplete mold filling, especially when large parts are produced. Therefore, an ideal epoxy resin/hardener system should build viscosity slowly when the resin and hardener are first mixed (i.e., have a long "open time"), so there is ample time to wet out the fibers and, in molding processes, to completely fill the mold.

On the other hand, a fast cure is wanted, because a fast cure permits more parts to be produced per unit time on a given piece of equipment. In molding processes, for example, the part should cure quickly so it can be demolded in as short a time as possible. Therefore, there is a strong desire to reduce the curing time as much as possible, consistent with making parts having acceptable quality. There are various ways to promote fast cure; this can be achieved, for example, through the use of catalysts or highly reactive hardeners. But there are other problems associated with faster curing systems such as these. One problem is that fast-curing systems tend to develop high viscosities very rapidly. Thus, the desire to develop fast-curing systems often works against the need for long open time.

Although the problem of balancing slow early viscosity development with fast cure exists across a wide spectrum of processes, in some processes this problem has been found to be especially difficult to resolve. For example, in some processes the fibers and moulds are often at least partially pre-heated to minimize cycle time. The introduction of the resin mixture into the mold exposes the resin to rapid localized heating at the points of contact with the heated fibers and heated mold surfaces, resulting in rapid localized curing and concomitant localized increases in viscosity. In other cases, the difficulty arises from the shear size of the part—the amount of resin that is needed is so large that it takes up to several minutes to fill the mold. In yet other cases, the resin must traverse a long flow path, which can take a considerable time.

Some of these problems can be at least partially overcome, at least in principle, by using high operating pressures that force the resin system into the mold more rapidly. But this is not feasible in many cases because the high operating pressures lead to large increases in equipment and/or operating costs. In other cases, high pressures can damage or distort the fibers or other inserts as may be present in the mold, or can move the fibers and/or other inserts around within the mold.

Therefore, there remains a need for an epoxy resin system that exhibits a long open time followed by a rapid cure, particularly for use in conjunction with preparing large, fiber-reinforced composites.

This invention is a curable epoxy resin system, comprising

I. an epoxy resin component containing at least 80% by weight of a polyglycidyl ether of a polyphenol that has an epoxy equivalent weight of up to about 250 and contains no more than 3% by weight of monohydrolyzed resin species;

II. a hardener containing a mixture of primary and/or secondary amino compounds, wherein the primary and/or secondary amino compounds contains (i) from 50 to 80% by weight of one or more aminocyclohexanealkylamine compounds; (ii) at least 20% by weight of one or more polyalkylene polyamines, (iii) from 0 to 25% by weight of one or more primary and/or secondary amino compounds different from (i) and (ii);

wherein component I or II or both contains a catalytically effective amount of one or more tertiary amine catalysts, and further wherein components I and II are present in amounts that provide a 5% to 50% excess of epoxy groups.

The invention is also a process for forming a thermoset, comprising mixing and curing the epoxy resin component and the hardener of the curable epoxy resin system of the invention.

In some embodiments, the invention is a process for forming a fiber-reinforced epoxy composite, comprising forming a reaction mixture containing an epoxy resin component and a hardener mixture, and curing the epoxy resin component with the hardener mixture in the presence of an effective amount of at least one tertiary amine catalyst and reinforcing fibers, wherein:

the epoxy resin component contains at least 80% by weight of a polyglycidyl ether of a polyphenol that has an epoxy equivalent weight of up to about 250 and contains no more than 3% by weight of monohydrolyzed resin species;

the hardener contains a mixture of primary and/or secondary amino compounds, wherein the primary and/or secondary amino compounds contain (i) from 50 to 80% by weight of one or more aminocyclohexanealkylamine compounds; (ii) at least 20% by weight of one or more polyalkylene polyamines, (iii) from 0 to 25% by weight of one or more primary and/or secondary amino compounds different from (i) and (ii);

and further wherein the epoxy resin component and the hardener are present in amounts that provide a 5% to 50% excess of epoxy groups.

The epoxy resin system and processes of the invention provide the advantages of long open time (as indicated by a slow increase in viscosity of the combined epoxy resin component/hardener mixture) followed by a fast cure. Because of the long open time, the reaction mixture tends to remain low enough in viscosity that it can be transferred easily into a mold or resin bath, where it can flow readily around reinforcing fibers to produce a composite product having few voids. Subsequent curing times are then desirably short and as a result short demold times can be achieved. Because of these advantages, the process of the invention is useful for producing a wide variety of composite products, of which automotive and aerospace components are notable examples.

The process is particularly beneficial for producing large composites that contain a kilogram or more of the cured resin system. The process is also particularly beneficial for producing fiber-reinforced parts via a process in which the epoxy resin system is injected into a mold under a low operating pressure (such as up to 150 psi (1.035 MPa)) and/or in which some core material in addition to the fibers is present in the mold.

The ability of the resin system of the invention to cure rapidly, leading to short demold times, is very surprising because of the presence of an excess of epoxy resin that is present in the system; such an excess would typically be expected to result in slower cure rather than a faster one.

The epoxy resin component contains one or more epoxy resins, by which it is meant compounds having an average of about two or more epoxide groups that are curable by reaction with a primary or secondary amine. At least 80% by weight of the epoxy resin component is one or more polyglycidyl ethers of a polyphenol that has an epoxy equivalent weight of up to about 250. Other epoxy resins as described below may constitute up to 20%, preferably from zero to 10% and more preferably from zero to 5% by weight of the epoxy resin component. The polyglycidyl ether of a polyphenol is most preferably the only epoxy resin in the epoxy resin component. The polyglycidyl ether of the polyphenol preferably has an epoxy equivalent weight of up to 220, still more preferably up to 200.

The polyglycidyl ether of the polyphenol may be a diglycidyl ether of a diphenol such as, for example, resorcinol, catechol, hydroquinone, bisphenol, bisphenol A, bisphenol AP (1,1-bis(4-hydroxylphenyl)-1-phenyl ethane), bisphenol F, bisphenol K, tetramethylbiphenol, or mixtures of two or more thereof. The polyglycidyl ether of the polyphenol may be advanced, provided that the epoxy equivalent weight is about 200 or less.

Suitable polyglycidyl ethers of polyphenols include those represented by structure (I)

ethers of polyglycols; epoxy novolac resins including cresol-formaldehyde novolac epoxy resins, phenol-formaldehyde novolac epoxy resins and bisphenol A novolac epoxy resins; cycloaliphatic epoxides; tris(glycidyloxyphenyl)methane; tetrakis(glycidyloxyphenyl)ethane; tetraglycidyl diaminodiphenylmethane; oxazolidone-containing compounds as described in U.S. Pat. No. 5,112,932; and advanced epoxy-isocyanate copolymers such as those sold commercially as D.E.R.™ 592 and D.E.R.™ 6508 (The Dow Chemical Company).

Still other useful epoxy resins are described, for example, in WO 2008/140906.

The epoxy resin component contains no more than 3%, preferably no more than 2% and still more preferably no more than 1% by weight of monohydrolyzed resin species. Monohydrolyzed resin species are α-glycol compounds formed by the addition of a molecule of water to an epoxide group. The presence of significant quantities of monohydrolyzed species tends to increase the viscosity of the epoxy resin component, and in turn that of the epoxy resin/hardener mixture. In addition, it is believed that these species may contribute to a reduction in open time.

The hardener contains a mixture of primary and/or secondary amine compounds.

Aminocyclohexanealkylamines constitute at least 50%, up to 80%, preferably up to 70% and more preferably up to 65% of the weight of the primary and/or secondary amino compounds in the hardener. Aminocyclohexanealkylamines are cyclohexanes that have an amino substituent and an aminoalkyl substitutent on the cyclohexane ring. Among the useful aminocyclohexanealkylamine compounds are those represented by structure I:

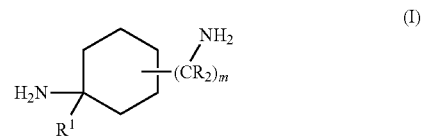

(I)

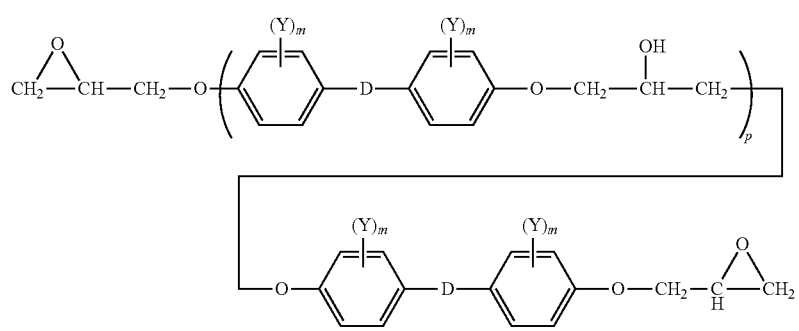

(I)

wherein each Y is independently a halogen atom, each D is a divalent hydrocarbon group suitably having from 1 to about 10, preferably from 1 to about 5, more preferably from 1 to about 3 carbon atoms, —S—, —S—S—, —SO—, —SO$_2$, —CO$_3$— —CO— or —O—, each m may be 0, 1, 2, 3 or 4 and p is a number from 0 to 5, especially from 0 to 2.

Among the other epoxy resins that may be present in the epoxy resin composition are, for example, polyglycidyl wherein R$^1$ is C$_1$-C$_4$ alkyl, each R is independently hydrogen or C$_1$-C$_4$ alkyl and m is a number from 1 to 8. Each R group in structure I is preferably independently hydrogen or methyl, and R$^1$ is preferably methyl. In structure I, the —(CR$_2$)$_m$—NH$_2$ group may be ortho, meta or para to the amino group bonded directly to the cyclohexane ring. The —NH$_2$ and —(CR$_2$)$_m$—NH$_2$ groups in structure I may be in the cis- or trans-positions with respect to each other. In structure I, the cyclohexane carbon atoms may contain inert substituent groups in addition to the —NH$_2$, —R$^1$ and —(CR$_2$)$_m$—NH$_2$ groups shown. A preferred compound corresponding to structure I is cyclohexanemethanamine, 4-amino-α,α,4-trimethyl-(9Cl), which is also known as p-menthane-1,8-diamine or 1,8-diamino-p-menthane.

A second type of aminocyclohexanealkylamine corresponds to structure II:

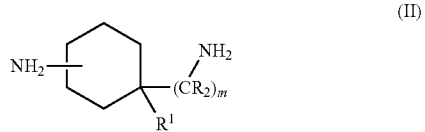

in which R, R$_1$ and m are as defined before. As in structure I, each R group in structure II is preferably independently hydrogen or methyl and R$^1$ is preferably methyl. In structure II, the —(CR$_2$)$_m$—NH$_2$ group may be ortho, meta or para to the amino group bonded directly to the cyclohexane ring. The —NH$_2$ and —(CR$_2$)$_m$—NH$_2$ groups in structure II may be in the cis- or trans-positions with respect to each other. In structure II, the cyclohexane carbon atoms may contain inert substituent groups in addition to the —NH$_2$, —R$^1$ and —(CR$_2$)$_m$—NH$_2$ groups shown. An especially preferred initiator compound that corresponds to structure II is 5-amino-1,3,3-trimethylcyclohexanemethylamine (isophorone diamine).

The hardener also contains one or more linear or branched polyalkylene polyamines. The polyalkylene polyamine may have three or more amine hydrogens per molecule, up to as many as 10 or more. The alkylene groups each may contain from 2 to 8 carbons, preferably from 2 to 6 carbons, and can be linear or branched. The polyalkylene polyamines may have amine hydrogen equivalent weights as low as about 20 to as much as 50. The molecular weight of the polyalkylene polyamine may be up to 500, preferably up to 200. The polyalkylene polyamine may contain one or more tertiary amino groups. These polyalkylene amines include for example, diethylene triamine, triethylene diamine, tetraethylenepentamine, higher polyethylene polyamines, N',N'-bis(2-aminoethyl)ethane-1,2-diamine, 2-methylpentane-1,5-diamine and the like. The polyalkylene polyamine constitutes at least 20% by weight, preferably from 20 to 50% by weight, of the primary and/or secondary amino compounds present in the hardener.

The hardener may contain (iii) one or more primary and/or secondary amino compounds different from the aminocyclohexanealkylamine(s) (i) and the polyalkylene polyamine(s) (ii). These compounds contain one or more primary and/or secondary amino groups and should contain at least two amine hydrogen atoms per molecule. These compounds may also contain one or more tertiary amino groups. If such compounds (iii) are present, they should constitute no more than 25% of the total weight of the primary and/or secondary amino compounds in the hardener. Such compounds (iii) may constitute no more than 20%, no more than 15%, no more than 10%, no more than 5% or no more than 2% of the total weight of the primary and/or second amino compounds in the hardener, and may be absent altogether.

The type (iii) hardener may be, for example, diaminocyclohexane, aminoethylpiperazine, dicyandiamide, phenylene diamine (particularly the meta-isomer), methylene dianiline, bis(4-amino-3,5-dimethylphenyl)-1,4-diisopropylbenzene, bis(4-amino-phenyl)1,4-diiospropylbenzene, mixtures of methylene dianiline and polymethylene polyaniline compounds (sometimes referred to as PMDA, including commercially available products such as DL-50 from Air Products and Chemicals), diethyltoluenediisocyanate, methylene bis(cyclohexylamine), 1,2-, 1,3- and/or 1,4-bis(aminomethyl)cyclohexane, 2- and/or 4-alkylcyclohexane-1,3-diamine, diaminodiphenylsulfone and amine-epoxy resin adducts such as are commercially available as D.E.H.™ 52 from The Dow Chemical Company. A preferred type (iii) compound is aminoethyl piperazine.

The hardener may contain small amounts of non-amine epoxy curing agents such as anhydrides, polyisocyanates, and the like. Anhydride hardeners such as styrene-maleic anhydride copolymers, nadic methyl anhydride, hexahydrophthalic anhydride, methylhexahydrophthalic anhydride, trimellitic anhydride, dodecyl succinic anhydride, phthalic anhydride, methyltetrahydrophthalic anhydride and tetrahydrophthalic anhydride are useful. Isocyanate hardeners that can be used include toluene diisocyanate, methylene diphenyldiisocyanate, hydrogenated toluene diisocyanate, hydrogenated methylene diphenyldiisocyanate, polymethylene polyphenylene polyisocyanates (and mixtures thereof with methylene diphenyldiisocyanate, commonly known as "polymeric MDI"), isophorone diisocyanate, and the like. Still other additional hardeners include hardeners described in WO 2008/140906.

If non-amine epoxy curing agents are present, they are preferably present in amounts of 10% of less, preferably 5% or less and still more preferably 2% or less of the total weight of the primary and/or secondary amine hardeners.

A preferred mixture of primary and/or secondary amines is a mixture of from 50 to 80% by weight of one or more aminocyclohexylalkylamines, from 20 to 50% by weight of one or more polyalkylene polyamines and from 0 to 20% by weight of aminoethylpiperazine. A more preferred mixture is a mixture of from 50 to 80% by weight isophorone diamine, from 20 to 50% of one or more polyalkylene polyamines and from 0 to 10% of aminoethylpiperazine. A still more preferred mixture is a mixture of from 55 to 80% by weight isophorone diamine, from 20 to 45% by weight of diethylene triamine and is devoid of other epoxy curing agents. In each case, the hardener is preferably devoid of other epoxy curing agents.

In this invention, the epoxy resin component and the hardener are brought together in proportions that provide a 5% to 50% excess of epoxy groups, i.e., from 5% to 50% more epoxy groups are provided by the epoxy resin component than there are epoxy-reactive groups in the hardener. Preferably a 5% to 40% excess of epoxy groups is provided and more preferably an 8% to 35% excess of epoxy groups is provided. Each amine hydrogen is considered as an epoxy-reactive group; therefore a primary amino group counts as two epoxy-reactive groups for purposes of this calculation. In preferred embodiments in which all of the epoxy-reactive materials are amines, from 1.05 to 1.5, more preferably from 1.05 to 1.4 and still more preferably from 1.08 to 1.35, epoxy groups are provided by the epoxy resin component per amine hydrogen provided in the hardener.

The catalyst is a tertiary amine catalyst. It contains at least one tertiary amine group and is devoid of groups that are reactive towards epoxy groups. Suitable tertiary amine catalysts include tertiary aminophenol compounds, benzyl tertiary amine compounds, imidazole compounds, or mixtures of any two or more thereof.

Tertiaryaminophenol compounds contain one or more phenolic groups and one or more tertiary amino groups. Examples of tertiary aminophenol compounds include mono-, bis- and tris(dimethylaminomethyl)phenol, as well as mixtures of two or more of these.

Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds contain one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxylmethylimidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

The catalyst is present in a catalytically effective amount. A suitable amount is typically from about 0.1 to about 10 parts by weight of catalyst(s) per 100 parts by weight of epoxy resin(s). A preferred amount is from 1 to 5 parts of catalyst(s) per 100 parts by weight of epoxy resin(s). The catalyst may be blended into the epoxy resin component before the epoxy resin component and hardener are mixed.

The catalyst may be blended into the epoxy resin or, more preferably, into the hardener before the epoxy resin component and hardener are brought together.

A non-tertiary amine catalyst may be present in addition to the tertiary amine catalyst, but such non-tertiary amine catalysts are not needed and preferably are absent. Suitable such non-tertiary amines catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference.

The open time of the curable epoxy resin system can be evaluated by measuring the viscosity of the mixture at a specified time after the epoxy resin component, hardener and catalyst are mixed. In a specific method, the epoxy resin component is heated to 60° C. The hardener and catalyst are mixed and brought to a temperature of 30° C. The hardener/catalyst mixture is then blended with the epoxy resin component and heated almost instantaneously to 85° C. while measuring viscosity over time at this temperature. The viscosity three minutes after the hardener/catalyst mixture is blended with the epoxy resin component is an indication of the open time. This viscosity preferably is no greater than 130 mPa·s and more preferably no greater than 100 mPa·s.

Gel time can be evaluated by rheometric methods, evaluating the shear storage modulus G' and the shear loss modulus G" as a mixture of the epoxy resin component, hardener and catalyst cures. The gel time in such an analysis is defined as the time after the epoxy resin component, hardener and catalyst are all brought together and added to the rheometer plate at which the shear storage modulus G' becomes equal to the shear loss modulus G". In a specific method, the epoxy resin component is heated to 60° C. The hardener and catalyst are mixed and brought to a temperature of 30° C. The hardener/catalyst mixture is then blended with the epoxy resin component and heated in almost instantaneously to 85° C., and then G' and G" are measured at this temperature in 8-15 second invervals using a cone-and-plate or plate-and-plate rheometer. The gel time measured in this way preferably is less than 12 minutes and more preferably less than 10 minutes. An especially preferred gel time is from 7 to 10 minutes.

In certain embodiments, the epoxy resin component and hardener are cured in the presence of reinforcing fibers to form a composite. The reinforcing fibers are thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or performs may in some embodiments be formed by entangling, weaving, stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing performs (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured epoxy resin and the fiber surfaces. The sizing in some embodiments may also have a catalytic effect on the reaction between the epoxy resin and the hardener.

The epoxy resin component and hardener may be cured in the presence of various optional ingredients, if desired. It is often convenient to incorporate these optional ingredients, if used, into either the epoxy resin component or the hardener, or both.

Among the useful optional ingredients is an internal mold release agent, which may constitute up to 5%, more preferably up to about 1% of the combined weight of the epoxy resin component and the hardener mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Würtz GmbH, Waterworks Aerospace Release by Zyvax and Kantstik™ by Specialty Products Co. In addition to (or instead of) adding the internal mold release agent at the mixhead, it is also possible to combine such an internal mold release agent into the resin component and/or the hardener before the resin component and the hardener are brought together.

Other optional components that can be present include solvents or reactive diluents, pigments, antioxidants, preservatives, impact modifiers, non-fibrous particulate fillers including micron- and nano-particles, wetting agents and the like.

The solvent is a material in which the epoxy resin, or hardener, or both, are soluble. The solvent is not reactive with the epoxy resin(s) or the hardener under the conditions of the polymerization reaction. The solvent (or mixture of solvents, if a mixture is used) preferably has a boiling temperature that is at least equal to and preferably higher than the curing temperature. Suitable solvents include, for example, glycol ethers such as ethylene glycol methyl ether and propylene glycol monomethyl ether; glycol ether esters such as ethylene glycol monomethyl ether acetate and propylene glycol monomethyl ether acetate; poly(ethylene oxide) ethers and poly(propylene oxide) ethers; polyethylene oxide ether esters and polypropylene oxide ether esters; amides such as N,N-dimethylformamide; aromatic hydrocarbons toluene and xylene; aliphatic hydrocarbons; cyclic ethers; halogenated hydrocarbons; and mixtures thereof. It is preferred to omit a solvent. If used, the solvent may constitute up to 75% of the weight of the reaction mixture (not including the reinforcing fiber), more preferably up to 30% of the weight of the mixture. Even more preferably the reaction mixture contains no more than 5% by weight of a solvent and most preferably contains less than 1% by weight of a solvent.

Suitable impact modifiers include natural or synthetic polymers having a $T_g$ of lower than −40° C. These include natural rubber, styrene-butadiene rubbers, polybutadiene rubbers, isoprene rubbers, core-shell rubbers, butylene oxide-ethylene oxide block copolymers, and the like. The rubbers are preferably present in the form of small particles that become dispersed in the polymer phase of the composite. The rubber particles can be dispersed within the epoxy resin or hardener and preheated together with the epoxy resin component or hardener prior to mixing them together.

Suitable particulate fillers have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

Thermosets are formed from the curable epoxy resin system of the invention by mixing the epoxy resin component and hardener, at proportions such that an excess of 5% to 50% of epoxy groups is provided, and allowing the resulting mixture to cure. Either or both of the components can be preheated if desired before they are mixed with each other. It is generally preferred to heat the mixture to an elevated temperature, such as from 60 to 220° C., to accelerate the cure.

The curable epoxy resin system of the invention is particularly useful for making fiber-reinforced composites by curing the system in the presence of reinforcing fibers as described before. These composites are in general made by mixing the epoxy resin component with the hardener to form a mixture, wetting the fibers with the mixture, and then curing the mixture in the presence of the catalyst and the reinforcing fibers. It is also possible to first wet the reinforcing fibers with either the epoxy resin component or the hardener (such as by dispersing the fibers into them) and then mixing the epoxy resin component with the hardener. Another alternative is to mix the epoxy resin component and the hardener in the presence of the reinforcing fibers.

The curing step may be performed in a mold. In such a case, the reinforcing fibers may be introduced into the mold before the epoxy resin/hardener mixture. This is normally the case when a fiber preform is used. The fiber preform is placed into the mold and the epoxy resin/hardener mixture is then injected into the mold, where it penetrates between the fibers in the preform and then cures to form a composite product.

Alternatively, the fibers (including a preform) can be deposited into an open mold, and the reaction mixture can be sprayed or injected onto the preform and into the mold. After the mold is filled in this manner, the mold is closed and the reaction mixture cured.

Short fibers can be injected into the mold with the hot reaction mixture. Such short fibers may be, for example, blended with the epoxy resin or hardener (or both), prior to forming the reaction mixture. Alternatively, the short fibers may be added into the reaction mixture at the same time as the epoxy and hardener are mixed, or afterward but prior to introducing the hot reaction mixture into the mold.

Alternatively, short fibers can be sprayed into a mold. In such cases, the reaction mixture can also be sprayed into the mold, at the same time or after the short fibers are sprayed in. When the fibers and reaction mixture are sprayed simultaneously, they can be mixed together prior to spraying. Alternatively, the fibers and reaction mixture can be sprayed into the mold separately but simultaneously. In a process of particular interest, long fibers are chopped into short lengths and the chopped fibers are sprayed into the mold, at the same time as or immediately before the hot reaction mixture is sprayed in.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold may contain, in addition to the reinforcing fibers, one or more inserts. Such inserts may function as reinforcements, and in some cases may be present for weight reduction purposes. Examples of such inserts include, for example, wood, plywood, metals, various polymeric materials, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperature prior to contacting them with the reaction mixture. The mold surface may be treated with an external mold release agent, which may be solvent or water-based.

The particular equipment that is used to mix the components of the reaction mixture and transfer the mixture to the mold is not considered to be critical to the invention, provided the reaction mixture can be transferred to the mold before it attains a high viscosity or develops significant amounts of gels. The process of the invention is amenable to RTM, VARTM, RFI and SCRIMP processing methods and equipment (in some cases with equipment modification to provide the requisite heating at the various stages of the process), as well as to other methods.

The mixing apparatus can be of any type that can produce a highly homogeneous mixture of the epoxy resin and hardener (and any optional components that are also mixed in at this time). Mechanical mixers and stirrers of various types may be used. Two preferred types of mixers are static mixers and impingement mixers.

In some embodiments, the mixing and dispensing apparatus is an impingement mixer. Mixers of this type are commonly used in so-called reaction injection molding processes to form polyurethane and polyurea moldings. The epoxy resin and hardener (and other components which are mixed in at this time) are pumped under pressure into a mixing head where they are rapidly mixed together. Operating pressures in high pressure machines may range from 1,000 to 29,000 psi or higher (6.9 to 200 MPa or higher), although some low pressure machines can operate at significantly lower pressures. The resulting mixture is then preferably passed through a static mixing device to provide further additional mixing, and then transferred into the mold cavity. The static mixing device may be designed into the mold. This has the advantage of allowing the static mixing device to be opened easily for cleaning.

In certain specific embodiments, the epoxy resin and hardener are mixed as just described, by pumping them under pressure into a mixing head. Impingement mixing may be used. The catalyst is introduced with the epoxy resin, the hardener, or as a separate stream. The operating pressure of the incoming epoxy resin and hardener streams may range from a somewhat low value (for example, from about 1 to about 6.9 MPa) or a high value (such as, for example, from 6.9 to 200 MPa). The resulting mixture of epoxy resin, hardener and catalyst is then introduced into the mold at a somewhat low operating pressure, such as up to 5 MPa or up to about 1.035 MPa). In such embodiments, the mixture of epoxy resin, hardener and catalyst is typically passed through a static mixer before entering the mold. Some or all of the pressure drop between the mixhead and the mold injection port often will take place through such a static mixer. This method is particularly suitable for making large parts in which the shot weight (amount of epoxy resin/hardener mixture introduced into the mold to make each part) is at least 1 kg, more typically at least 5 kg and often 10 kg or greater. In such embodiments, the mold may contain a core material as described before, such as a polymer foam core.

An especially preferred apparatus for conducting the process is a reaction injection molding machine, such as is commonly used to processes large polyurethane and polyurea moldings. Such machines are available commercially from Krauss Maffei Corporation and Cannon or Hennecke.

In other embodiments, the hot reaction mixture is mixed as before, and then sprayed into the mold. Temperatures are maintained in the spray zone such that the temperature of the hot reaction mixture is maintained as described before.

The mold is typically a metal mold, but it may be ceramic or a polymer composite, provided that the mold is capable of withstanding the pressure and temperature conditions of the molding process. The mold contains one or more inlets, in liquid communication with the mixer(s), through which the reaction mixture is introduced. The mold may contain vents to allow gases to escape as the reaction mixture is injected.

The mold is typically held in a press or other apparatus which allows it to be opened and closed, and which can apply pressure on the mold to keep it closed during the filling and curing operations. The mold or press is provided with means by which heat or cooling can be provided.

A composite can be made in accordance with the invention using a pultrusion process. Pultrusion processes use continuous fibers that are oriented parallel to each other, in the direction of extrusion. Pultrusion processes are operated in a manner analogous to molding processes, the main difference being that the hot reaction mixture is delivered into a resin bath rather than into a mold. The resin bath is a reservoir filled with the reaction mixture, through which the continuous fibers are pulled. The resin bath typically has some means, such as a series of pins, which separate the fibers slightly to permit them to be coated on all surfaces with the reaction mixture. Once the fibers are wetted with the reaction mixture, they are pulled through one or more dies, in which the fibers are consolidated and formed into the desired cross-sectional shape. The die(s) are heated, to temperatures as described before, to cause the reaction mixture to cure.

The process of the invention is useful to make a wide variety of composite products, including various types of automotive parts. Examples of these automotive parts include vertical and horizontal body panels, automobile and truck chassis components, and so-called "body-in-white" structural components.

Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite. In addition, these parts are often coated in the so-called "e-coat" process, and for that reason must be somewhat electroconductive. Accordingly, an electroconductive filler as described before may be used in body panel applications to increase the electrical conductivity of the part. An impact modifier as described before is often desired in body panel applications to toughen the parts. Short cycle times are usually of high importance to the economics of body panel manufacture. For this reason, more highly reactive epoxy resins and hardeners are favored in these applications, and the preheating temperature may be somewhat higher than 80° C.

The epoxy resin system cures rapidly after its initially long open time. Demold times for any specific process will of course depend on the particular circumstances of the process, including cure temperature, part size, catalyst levels, and other factors. For larger parts, cure times may be as much as 30 minutes, but are more preferably below 20 minutes. In general, demold times are short compared to other systems that provide comparable open times.

Automotive and truck chassis components made in accordance with the invention offer significant weight reductions compared to steel. This advantage is of most significance in large truck applications, in which the weight savings translate into larger vehicle payload. Automotive chassis components provide not only structural strength, but in many cases (such as floor modules) provide vibration and sound abatement. It is common to apply a layer of a dampening material to steel floor modules and other chassis parts to reduce sound and vibration transmission through the part. Such dampening materials can be applied in similar manner to a composite floor module made in accordance with this invention.

The following examples are provided to illustrate the invention, but not limit the scope thereof. All parts and percentages are by weight unless otherwise indicated.

Examples 1-5 and Comparative Samples A-C

In these samples, a diglycidyl ether of bisphenol A, having an epoxy equivalent weight of about 178 and less than 1% by weight of monohydrolyzed resin is cured with various hardener mixtures in the presence of tris(dimethylaminomethyl)phenol catalyst. The ratio of epoxy groups to amine hydrogens is varied as indicated in Table 1. The composition of the hardener is also varied as indicated in Table 1.

The samples are made and tested as follows: 100 parts of the epoxy resin is heated to 60° C. The hardeners are mixed and enough of the hardener mixture is measured out to provide the ratio of epoxy groups to amine hydrogens indicated in Table 1 for the various samples. 2.2 parts of the tris(dimethylaminomethyl)phenol catalyst are then added to the measured hardener mixture, and the resulting hardener/catalyst blend is heated to 30° C. The heated resin and heated hardener/catalyst blend are then mixed and poured onto a rheometer plate maintained at a temperature of 85° C. Viscosity is measured 3 minutes after the epoxy resin and hardener/catalyst mixture is added to the rheometer plate. G' and G" are measured at 8-15 second intervals. The point in time at which G' becomes equal to G" is taken as the gel time. $T_g$ is measured by dynamic mechanical analysis.

Results are as indicated in Table 1.

three minutes is significantly lower than that of Comparative Sample A, indicating a significant increase in open time. This is accomplished with little change in gel time.

The glass transition temperatures of the cured samples are indicative of the extent of cure. Glass transition temperature in these tests serves as a rough predictor of relative demold time, because as the cure becomes more complete, glass transition temperature increases. Therefore, a higher glass transition temperature indicates a greater extent of cure, and the ability to demold a part depends to a large degree on how completely it has cured on the mold. The glass transition temperature of Example 2 unexpectedly is increased to 136° C., compared to only 129° C. for Comparative Sample A. When 20% excess of epoxy resin is used (Example 4), the open time (indicated by viscosity after three minutes) is even longer and the glass transition temperature increases to 140° C. Again, these benefits are seen with little change in gel time.

Comparative Samples B and C demonstrate the effect of using a hardener mixture containing isophorone diamine with only small amounts of diethylene triamine. These samples have good open times, as indicated by the viscosity after three minutes, but gel times are quite long despite the presence of excess epoxy resin. When the amount of DETA is increased to 20% (Example 1), gel time is reduced while maintaining a very long open time.

Examples 3 and 4 show that a mixture of diethylene triamine and aminoethylpiperazine in combination with isophorone diamine also can lead to a good combination of open time, gel time and glass transition temperature, if the epoxy resin is present in excess.

Example 6 and Comparative Samples D and E 100 parts by weight of a diglycidyl ether of bisphenol A having an epoxy equivalent weight of about 178 and less than 1% by weight of monohydrolyzed resin is cured with a mixture of 9.22 parts of an aminocyclohexanealkylamine having an amine hydrogen equivalent weight of about 43, 6.16 parts of a polyethylene polyamine having an amine hydrogen equivalent weight of about 21, and 2.42 parts

TABLE 1

| Sample Design. | % Excess Epoxy[1] | Hardener Composition[2] | Viscosity after 3 minutes, mPa · s | Gel time, min. | $T_g$, ° C. |
|---|---|---|---|---|---|
| A* | 0% | 60 IPDA/40 DETA | 146 | 7.7 | 129 |
| B* | 10% | 95 IPDA/5 DETA | 49 | 16.3 | 144 |
| C* | 10% | 90 IPDA/10 DETA | 51 | 12.9 | 148 |
| 1 | 10% | 80 IPDA/20 DETA | 55 | 10.9 | 145 |
| 2 | 10% | 60 IPDA/40 DETA | 117 | 8.0 | 136 |
| 3 | 10% | 60 IPDA/30 DETA/10 AEP | 121 | 8.5 | 136 |
| 4 | 10% | 60 IPDA/20 DETA/20 AEP | 120 | 9.5 | 142 |
| 5 | 20% | 60 IPDA/40 DETA | 98 | 8.1 | 140 |

*Comparative.
[1]Calculated as (Equivalents epoxy groups − equivalents amine hydrogens)/equivalents amine hydrogens.
[2]Amounts are percentages by weight, based on the total weight of the amines.
IPDA is isophorone diamine.
DETA is diethylene triamine.
AEP is aminoethylpiperazine.

The data in Table 1 demonstrates the effect of varying the hardener composition and the epoxy/hardener ratio. Comparative Sample A develops viscosity rapidly and therefore has a short open time. In addition, the glass transition temperature of the cured resin is low. Examples 2 and 5 directly compare with Comparative Sample A, and show the beneficial effect of having an excess of the epoxy resin. At a 10% excess of epoxy resin (Example 2), the viscosity at tris(dimethylaminomethyl)phenol catalyst, in the presence of 1 part of an internal mold release. This reaction mixture contains 1.09 epoxy groups per amine hydrogen, i.e., an excess of 9% epoxy groups.

Example 6 is made and tested as follows: The epoxy resin is mixed with the internal mold release and heated to 60° C. The hardener mixture is separately brought to a temperature of about 30° C.

A pre-formed fiber glass reinforcement mat having a weight of 450 g/m² is manually positioned into a 2 meters×2.4 meters×40 cm deep curved mold that contains a polymer foam core, and the mold is closed and clamped to a pressure of 2000 kN. The upper mold is heated to 82° C. and the lower mold is heated to 85° C.; those temperatures are maintained through the filling and curing steps. The hardener, epoxy resin and internal mold release are brought to a high pressure impingement mixhead where they are mixed, and passed through a static mixer dispensing unit and into the mold. Air is removed from upper side vents of the mold. Pouring time is 161 seconds with a throughput of 230 g/second.

Various parts are made in the same manner, gradually reducing the demold time to evaluate how rapidly the part could be demolded. In this set of experiments, demold characteristics are indicated by how easily the part can be removed from the mold, and by evaluating the Shore D hardness of the part. The target Shore D hardness is 82 for these experiments.

Parts made with a 23 minute demold time demold easily and have good surface appearance. Parts made with a 20 minute demold time also demold easily. These parts have a Shore D hardness of 85-87.

When the demold time is reduced to 17 minutes, the parts still demold easily and have a Shore D hardness of 82 to 85.

When Example 6 is repeated using an epoxy resin that contains about 5% monohydrolyzed resin species, the mold becomes hard to fill because of the rapidly increasing viscosity of the system. The parts develop flow lines and other surface imperfections.

As a further comparison, additional parts are made in the general manner described in Example 2 of WO 2008/153, 542. The best demold time is 23 minutes.

Example 7

A hardener/catalyst mixture is prepared by mixing an aminocyclohexanealkylamine having an amine hydrogen equivalent weight of about 43, a polyethylene polyamine having an amine hydrogen equivalent weight of about 21 and 2,4,6-tris(dimethylamino)methyl)phenol at a weight ratio of about 51:36:13.

18.5 parts of this hardener mixture are combined with 100 parts by weight of a diglycidyl ether of bisphenol A having an epoxy equivalent weight of about 178 in the manner described with respect to Example 1, and gel time is measured to be about 10 minutes at 85° C. This ratio of starting materials corresponds to a ratio of about 1.05 epoxy groups per amine hydrogen (i.e., a 5% excess). Viscosity after three minutes is about 85 mPa·s.

Further gel time experiments are conducted at cure temperatures of 100° C. to 130° C., using a resin:hardener mixture ratio of either 100:18.5 or 100:17.5, as indicated in Table 2 below. The epoxy resin is heated to 80° C. in a feed tank of a resin transfer molding machine. The hardener is heated to 30° C. in a separate tank and an external mold release is heated in a third tank to 30° C. The components are mixed at a ratio of 100 parts resin, 18.5 or 17.5 parts hardener mixture and 1 part internal mold release at an injection flow rate of 35 g/s and discharged into an open 620 mm×460 mm×2.2 mm mold that has been coated with an external mold release and is heated to the designated mold temperature. The time at which the resin/hardener mixture first hits the mold surface is designated time=zero. A spatula periodically is scored through the surface of the curing liquid resin disk periodically, using a pallet knife or similar blade. The gel time is the time after which the liquid material no longer flows into the scored line. Demold time is the time at which the part can be demolded with permanent distortion or damage. Results are as indicated in Table 2.

TABLE 2

| Mold Temp, ° C. | Weight ratio, resin:hardener mixture | Equivalent ratio, epoxy groups/amine hydrogens | Gel time, s | Demold time (minutes) |
|---|---|---|---|---|
| 100 | 100:18.5 | 1.05:1 | 160 | 9 |
| 100 | 100:17.5 | 1.10:1 | 170 | 10 |
| 110 | 100:18.5 | 1.05:1 | 90 | 7 |
| 110 | 100:17.5 | 1.10:1 | 90 | 7 |
| 120 | 100:18.5 | 1.05:1 | 60 | 7 |
| 120 | 100:17.5 | 1.10:1 | 60 | 7.5 |
| 130 | 100:18.5 | 1.05:1 | 40 | 6 |
| 130 | 100:17.5 | 1.10:1 | 40 | 6 |

Carbon fiber composite parts are made in the same general manner using the resin transfer molding machine. Six layers of Panex®35 continuous tow 330 g/m² carbon fiber mats are placed into the mold before dispensing the resin/hardener/internal mold release agent mixture. The resin/hardener mixture is 100:18.5, which provides 1.05 epoxide groups/amine hydrogen (an excess of 5% epoxy groups). When the parts are demolded after 10 minutes, the glass transition temperature (measured by dynamic mechanical analysis) of the resin phase is 140° C. When the parts are demolded after as little as five minutes, the glass transition is virtually unchanged at 138° C.

What is claimed is:

1. A curable epoxy resin system, comprising
   I. an epoxy resin component containing at least 80% by weight of a polyglycidyl ether of a polyphenol that has an epoxy equivalent weight of up to about 250 and contains no more than 1% by weight of monohydrolyzed resin species;
   II. a hardener containing a mixture of primary and/or secondary amino compounds
   primary and/or secondary amino compounds that contains from 55 to 80% by weight of isophorone diamine, from 20 to 45% by weight of diethylene triamine, and the hardener is devoid of other epoxy curing agents
   wherein component I or II or both contains a catalytically effective amount of one or more tertiary amine catalysts,
   and further wherein components I and II are present in amounts that provide from 1.05 to 1.5 epoxy groups per amine hydrogen in the hardener.

2. The curable epoxy resin system of claim 1, wherein components I and II are present in amounts that provide from 1.08 to 1.35 epoxy groups per amine hydrogen in the hardener.

3. The curable epoxy resin system of claim 1, which has a gel time of less than 10 minutes.

* * * * *